W. LUDWIG.
LOCKING DEVICE FOR AUTOMOBILES.
APPLICATION FILED JAN. 27, 1920.

1,382,300.

Patented June 21, 1921.

INVENTOR.
William Ludwig
By H. E. Dunlap
ATTORNEY.

UNITED STATES PATENT OFFICE.

WILLIAM LUDWIG, OF BELLAIRE, OHIO.

LOCKING DEVICE FOR AUTOMOBILES.

1,382,300. Specification of Letters Patent. Patented June 21, 1921.

Application filed January 27, 1920. Serial No. 354,417.

*To all whom it may concern:*

Be it known that I, WILLIAM LUDWIG, a citizen of the United States of America, and resident of Bellaire, county of Belmont, and State of Ohio, have invented certain new and useful Improvements in Locking Devices for Automobiles, of which the following is a specification.

This invention relates to locks for vehicles, and more particularly to a device for preventing the unauthorized movement of motor cars and the like.

The primary object of the invention is to provide a simple, efficient and convenient device whereby an automobile or other vehicle may be secured when not in use, as when parked upon a street, to guard against theft or unauthorized movement from the parking place.

A further object is to provide a device of the character mentioned which is permanently attached to the car in a position convenient for ready application for locking purposes, and which, when not in use, is carried in an out-of-the-way and unobtrusive position.

With these and other objects in view, the invention resides in the features of construction, arrangement of parts and combinations of elements which will hereinafter be described, reference being had to the accompanying drawings, in which—

Referring to said drawings, 1 indicates a bracket which carries at one end thereof a transversely extending rod or pintle 2. Said bracket is preferably formed of a flat metal plate which has a rectangular opening formed therein adjacent to one of its ends and which has said one end turned or doubled back upon itself forming eye-like bearings 3 at opposite sides of an outwardly opening recess 4 constituted by or through the provision of said rectangular opening; and said bearings 3 have the opposite ends of said pintle 2 mounted therein.

Figure 1:
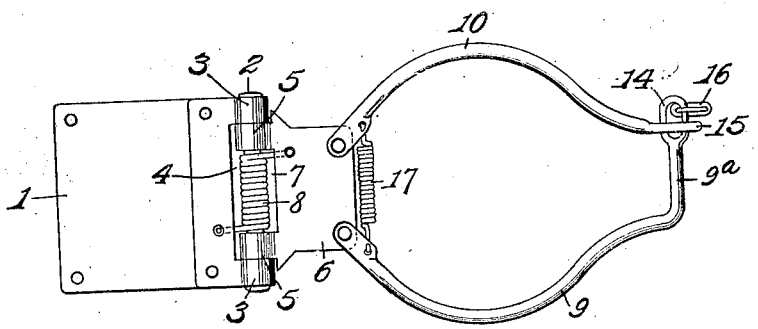
Figure 1 is a bottom plan view of the invention, and—
Figure 2:
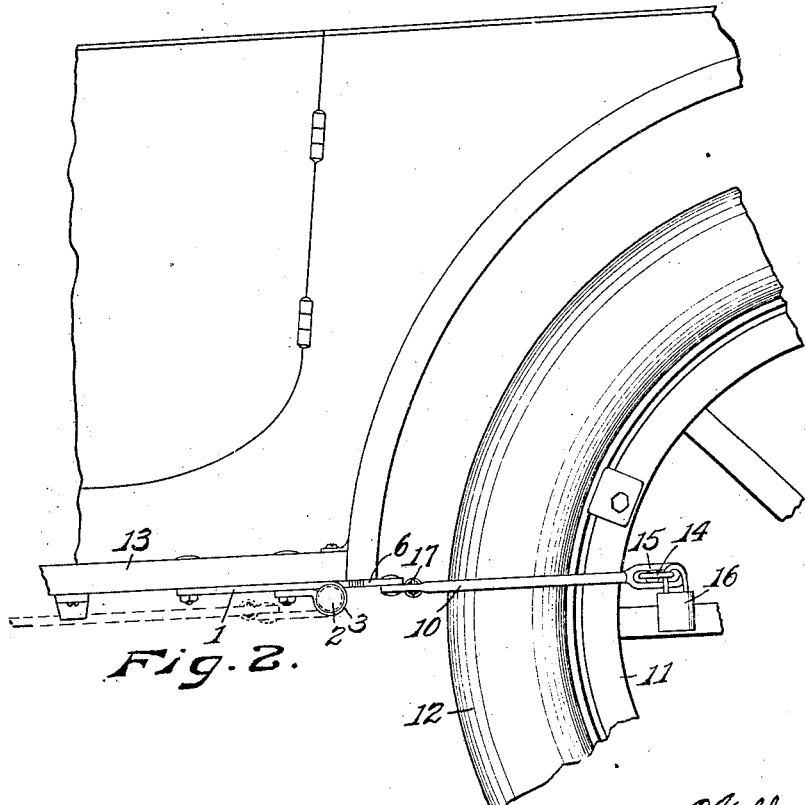
Fig. 2 is a side elevation of a fragmentary portion of an automobile, illustrating the application of the invention.

Mounted for rotary movement on said pintle adjacent to the inner end of each of said bearings 3 is an eye-portion 5 formed upon a plate 6, said eye-portions of said plate being separated by a recess 7. A spiral spring 8 carried by said pintle between said eye-portions is so associated with the bracket 1 and the plate 6 that the latter is normally maintained in a closed position relative to the former—that is, in a position closely underlying said plates—as indicated in dotted lines in Fig. 2.

Pivotally connected to the outer end of the plate 6 at opposite points are two arms 9 and 10 designed to complementally form a loop for embracing the felly 11 and tire 12 of the adjacent rear wheel of the automobile.

The bracket 1 is designed for permanent attachment to the under side of the usual running board 13 of an automobile at a point adjacent to the rear end of said running board so that in the extended position of the plate 6 the latter will more or less closely approach the tire 12. During the act of extending said plate 6, the arms 9 and 10 are held in spread relation so that they will unobstructedly pass on opposite sides of the tire 12 and felly 11, after which they are closed one upon the other at the inner side of the felly. The arm 9 has its outer end portion turned laterally inward, as shown at 9ª, and has an eye 14 formed in the end thereof, and the arm 10 has an eye 15 formed in its outer end adapted to permit the eye portion 14 of the arm 9 to pass therethrough, as shown in the drawings. Suitable means, as a padlock 16, is employed for maintaining the closed relation of said arms 9 and 10 with respect to the wheel.

A retractile coil spring 17 connects the two arms 9 and 10 adjacent to their inner ends, said spring being designed to yieldingly maintain the closed relation of said arms when the latter, with the plate 6, occupy their inoperative or folded position on the under side of the running board.

What is claimed is—

1. In a device of the character described, a bracket adapted for mounting in fixed position on an automobile adjacent to a wheel of the latter, a member articulated with said bracket and foldable with respect to the latter, a coil spring normally maintaining said member in folded relation to said bracket, a pair of complemental arms pivotally mounted on said foldable member and adapted to be disposed in embracing relation to the tire and felly of the adjacent wheel, and means for securing said arms in such relation.

2. Locking means for automobiles comprising a member pivotally mounted on the under side of the running board adjacent to a rear wheel, a pair of complemental arms pivotally carried by said member and adapted in one position of the latter to embrace the tire and felly of said wheel, and means for securing said arms in such relation, and resilient means connecting said arms adjacent to their pivoted ends.

3. Locking means for automobiles comprising a member pivotally mounted on the under side of the running board adjacent to a rear wheel, a pair of complemental arms pivotally carried by said member and adapted in one position of the latter to embrace the tire and felly of said wheel, said arms having their free ends shaped for interengagement, means for securing said ends against separation, and resilient means normally tending to hold said arms in their engaged relation.

4. In a device of the character described, a bracket adapted for mounting in fixed position on an automobile adjacent to a wheel of the latter, a member articulated with said bracket and foldable with respect to the latter, yieldable means normally maintaining said member folded with respect to said bracket, a pair of arms pivotally mounted on said member and adapted in the extended position of the latter to occupy positions on opposite sides of the tire and felly of the adjacent wheel, said arms having their free ends shaped for interengagement at a point located inward with respect to said felly, and means for securing the interengaged ends against separation.

5. In a device of the character described, a bracket adapted for mounting in fixed position on an automobile adjacent to a wheel of the latter, a member articulated with said bracket and foldable with respect to the latter, yieldable means normally tending to restrain said member against inward swinging movement from its folded position, a pair of arms pivotally mounted on said member and adapted in the extended position of the latter to occupy positions on opposite sides of the tire and felly of the adjacent wheel, said arms having eyes formed in their free ends and the eye portion of one thereof being adapted to protrude through the eye of the other, and a lock engaged with the protruding eye portion for preventing separation of said arms.

6. In a device of the character described, a bracket adapted for mounting in fixed position on an automobile adjacent to a wheel of the latter, a member articulated with said bracket and foldable with respect to the latter, a pair of arms pivotally mounted on said member and adapted in the extended position of the latter to occupy positions on opposite sides of the tire and felly of the adjacent wheel, said arms being oppositely curved and adapted to meet at the inner side of said felly, means for securing the meeting ends of said arms against separation, and tension means whereby said member and said arms are actuated to assume folded position when the latter is disengaged from the wheel.

7. In a device of the character described, a bracket adapted for mounting in fixed position on an automobile adjacent to a wheel of the latter, a member articulated with said bracket and foldable with respect to the latter, yieldable means normally maintaining said member folded with respect to said bracket, a pair of arms pivotally mounted on said member and adapted in the extended position of the latter to occupy positions on opposite sides of the tire and felly of the adjacent wheel, said arms being oppositely curved and adapted to meet at the inner side of said felly, means for securing the meeting ends of said arms against separation, and resilient means connecting said arms adjacent to their pivoted ends.

8. In a device of the character described, a bracket adapted for mounting in fixed position on an automobile adjacent to a wheel of the latter, a member articulated with said bracket and foldable with respect to the latter, a pair of arms pivotally mounted on said member and adapted in the extended position of the latter to complementally encircle the tire and felly of the adjacent wheel, said arms being oppositely curved and adapted to meet at the inner side of said felly, means for securing the meeting ends of said arms against separation, and resilient means normally maintaining said arms in their relatively closed positions.

9. In a device of the character described, a bracket adapted for mounting on the under side of an automobile running board adjacent to the rear end of the latter, a member pivotally connected to the rear end of said bracket, resilient means tending to restrain said member from being extended from a folded position against the under side of said bracket and to return said member from extended position to folded position following release thereof, a pair of arms pivotally mounted on said member and adapted in the extended position of the latter to occupy positions on opposite sides of the tire and felly of the adjacent wheel of the automobile, said arms being relatively shaped to complementally encircle said tire and felly, and means for securing the free ends of said arms against separation.

10. Locking means for automobiles comprising a member pivotally mounted on the under side of an automobile running board and foldable against the latter, means pivotally carried by said member and adapted for adjustment into encircling relation to an adjacent portion of the tire and felly of an adjacent wheel of the automobile, and means for securing said pivoted means in the last-mentioned position.

In testimony whereof I affix my signature in presence of two subscribing witnesses.

WILLIAM LUDWIG

Witnesses:
C. W. RODEWIG,
THOS. J. RUDGE.